United States Patent
Costyson et al.

(10) Patent No.: US 10,414,106 B2
(45) Date of Patent: Sep. 17, 2019

(54) PRESSURE JAW ASSEMBLY AND A SEALING JAW ARRANGEMENT

(71) Applicant: Tetra Laval Holdings & Finance S.A., Pully (CH)

(72) Inventors: Emil Costyson, Helsingborg (SE); Philipp Liljevall, Limhamm (SE)

(73) Assignee: TETRA LAVAL HOLDINGS & FINANACE S.A., Pully (CH)

( * ) Notice: Subject to any disclaimer, the term of this patent is extended or adjusted under 35 U.S.C. 154(b) by 0 days.

(21) Appl. No.: 15/737,779

(22) PCT Filed: Sep. 5, 2016

(86) PCT No.: PCT/EP2016/070894
§ 371 (c)(1),
(2) Date: Dec. 19, 2017

(87) PCT Pub. No.: WO2017/042136
PCT Pub. Date: Mar. 16, 2017

(65) Prior Publication Data
US 2019/0001584 A1    Jan. 3, 2019

(30) Foreign Application Priority Data
Sep. 10, 2015    (SE) ...................................... 1551158

(51) Int. Cl.
*B32B 37/00* (2006.01)
*B29C 65/00* (2006.01)
(Continued)

(52) U.S. Cl.
CPC ............ *B29C 66/849* (2013.01); *B29C 65/18* (2013.01); *B29C 65/36* (2013.01);
(Continued)

(58) Field of Classification Search
CPC ..... B29C 65/18; B29C 65/36; B29C 65/7451; B29C 66/849; B29C 66/1122;
(Continued)

(56) References Cited

U.S. PATENT DOCUMENTS 4,630,429 A * 12/1986 Christine ................ B29C 65/18
156/515
5,673,534 A * 10/1997 Fowler .................... B29C 65/18
493/194
(Continued)

FOREIGN PATENT DOCUMENTS

| EP | 1466839 | 10/2004 |
| GB | 1426626 | 3/1976 |
| WO | WO 86/04559 | 8/1986 |

OTHER PUBLICATIONS

International Search Report from corresponding PCT Application No. PCT/EP2016/070894 dated Dec. 6, 2016 (2 pages).
(Continued)

Primary Examiner — James D Sells
(74) Attorney, Agent, or Firm — Finnegan, Henderson, Farabow, Garrett & Dunner LLP (57) ABSTRACT

A pressure jaw assembly (1) for a sealing jaw arrangement of a filling machine. The pressure jaw assembly (1) comprises a pressure jaw frame (10), a pressure element (20) arranged to be moved relative the pressure jaw frame (10), a compressing means (40) arranged at least partly between the pressure jaw frame (10) and the pressure element (20). The compressing means (40) is arranged to influence the relative movement between the pressure element (20) and the pressure jaw frame (10). The pressure jaw assembly (1) further comprises a guide (50, 52) for guiding the pressure element (20). The guide (50, 52) is connected to the pressure jaw frame (10), and the guide (50, 52) is arranged externally of the pressure element (20).

21 Claims, 3 Drawing Sheets

(51) Int. Cl.
  *B29C 65/18* (2006.01)
  *B29C 65/36* (2006.01)
  *B29C 65/74* (2006.01)
  *B65B 51/30* (2006.01)
  *B29C 65/08* (2006.01)
  *B29C 65/38* (2006.01)
  *B65B 51/22* (2006.01)

(52) U.S. Cl.
  CPC ...... *B29C 65/7451* (2013.01); *B29C 66/1122* (2013.01); *B29C 66/4312* (2013.01); *B29C 66/816* (2013.01); *B29C 66/8145* (2013.01); *B29C 66/8161* (2013.01); *B29C 66/8167* (2013.01); *B29C 66/81431* (2013.01); *B29C 66/8351* (2013.01); *B65B 51/30* (2013.01); *B29C 65/08* (2013.01); *B29C 65/38* (2013.01); *B65B 51/225* (2013.01)

(58) Field of Classification Search
  CPC .......... B29C 66/4312; B29C 66/81431; B29C 66/8145; B29C 66/816; B29C 66/8161; B29C 66/8167; B29C 66/8351; B65B 51/30
  USPC ......................................................... 156/580
  See application file for complete search history.

(56) References Cited

U.S. PATENT DOCUMENTS 5,771,660 A    6/1998  Loewenthal
7,174,699 B1   2/2007  Wyman

OTHER PUBLICATIONS

Office Action from corresponding Swedish Application No. 1551158-7 dated Apr. 7, 2016 (6 pages).

* cited by examiner

PRESSURE JAW ASSEMBLY AND A SEALING JAW ARRANGEMENT

CROSS-REFERENCE TO RELATED PATENT APPLICATIONS

This is a National Phase of International Application No. PCT/EP2016/070894, filed Sep. 5, 2016, which claims the benefit of Swedish Application No. 1551158-7, filed Sep. 10, 2015. The entire contents of the above-referenced applications are expressly incorporated herein by reference.

TECHNICAL FIELD

The present invention relates to a pressure jaw assembly for a sealing jaw arrangement of a filling machine, and to a sealing jaw arrangement comprising such pressure jaw assembly.

BACKGROUND OF THE INVENTION

In filling machines for liquid food packages, such as e.g. sold by Tetra Pak under the name Tetra Pak A1, a web of packaging material is sterilized, and is subsequently formed into a tube by making the longitudinal edges of the web overlap each other and sealing the overlap area. This tube is filled with liquid food continually, and the tube of packaging material is transversally sealed and cut such that separate packages with liquid food are formed.

The transversally seal procedure is typically carried out by a sealing jaw arrangement. The sealing jaw arrangement often comprises a pressure jaw assembly and a heating jaw assembly, wherein the portion of the tube subject to receive a transversal seal is arranged in between the pressure jaw assembly and heating jaw assembly during the formation of the seal. The pressure jaw assembly is arranged to provide means for allowing the sealing jaw arrangement to press the packaging material of the tube during the formation of the seal, and the heating jaw assembly is arranged to provide sufficient heat to the packaging material of the tube needed for the formation of the seal.

In order for the pressure jaw assembly to provide means enabling a sufficient applied pressure to the tube, the pressure jaw assembly often comprises some type of compressing means and a guiding arrangement adapted for internally guiding parts of the pressure jaw assembly. One such guiding arrangement comprises rubber bushings.

However, the pressure jaw assembly of the sealing jaw arrangement may give rise to an uneven sealing pressure due to e.g. fatigue of the rubber bushings. Thus, there is a need in the industry for an improved pressure jaw assembly.

SUMMARY OF THE INVENTION

It is an object of the present invention to improve the current state of the art, to solve the above problem and to provide an improved pressure jaw assembly. These and other objects are achieved by a pressure jaw assembly for a sealing jaw arrangement of a filling machine, and by a sealing jaw arrangement.

According to a first aspect of the present invention, a pressure jaw assembly for a sealing jaw arrangement of a filling machine is provided. The pressure jaw assembly comprises:

a pressure jaw frame, a pressure element arranged to be moved relative said pressure jaw frame, a compressing means arranged at least partly between said pressure jaw frame and said pressure element, said compressing means being arranged to influence the relative movement between said pressure element and said pressure jaw frame, a guide for guiding said pressure element, wherein said guide is connected to said pressure jaw frame, and wherein said guide is arranged externally of said pressure element.

By having said guide arranged externally of said pressure element, the rubber bushings may be dispensed with, resulting in a pressure jaw assembly which is less prone to be degraded, at least due to fatigue of the rubber bushings/guiding element. Furthermore, as the design of the pressure jaw assembly hereby is simplified, the manufacturing process of certain parts may be improved. For example, the pressure element and/or the pressure jaw frame may preferably be manufactured by casting, as the pressure element and/or the pressure jaw frame comprise less internal components.

Furthermore, by providing an externally arranged guide, which is physically separated from the compressing means, the compressing means may be chosen more freely. Hence, according to at least one example embodiment, the guide is not part of the compressing means. According to at least one example embodiment, the guide is rigid (i.e. it is not compressible).

According to at least one example embodiment, said compressing means acts directly on said pressure element and/or directly on said pressure jaw frame. Said compressing means may be a compressing element.

It should be understood that the compressing means influence the movement of the pressure element by e.g. dampening the movement of the pressure element towards the pressure jaw frame, i.e. as the compressing means are being compressed. Furthermore, the compressing means may act on the pressure element and press the pressure element in a direction away from the pressure jaw frame during a rebounding action of the compressing means, i.e. after the compressing means has been compressed and is acting to get back to the position it had before being compressed. The compressing means enables the pressure jaw assembly to be pressed against an anvil, such as e.g. a heating jaw assembly, in order to compress the tube of packaging material which in use is arranged between the pressure element and the anvil, with a reduced risk of destroying the parts of the pressure jaw assembly (as the pressing action is not performed by two rigidly elements). In other words, as the pressure element is allowed to be pressed towards the pressure jaw frame by means of the compressing means, a dampening function of the pressure jaw assembly is provided.

It should be understood that said guide is connected, or is being attached, directly or indirectly to said pressure jaw frame. In other words the guide is arranged to be static, or moved, together with the pressure jaw frame. The guide may e.g. protrude in an orthogonal direction compared to the main extension of the pressure jaw frame. According to at least one example embodiment, the guide is protruding parallel to a direction from said pressure jaw frame towards said pressure element.

It should be understood that the guide is arranged externally of the pressure element, i.e. outside of the pressure element, such as e.g. along at least one of the lateral sides of the pressure element. In other words, the pressure element is free of any internal guides, such as e.g. internally arranged rubber bushings. Thus, according to at least one example embodiment, the pressure element is a rubber-bushing-free pressure element.

According to at least one example embodiment, said guide is arranged to guide said pressure element at least in an axial direction of said pressure jaw assembly. The axial direction may be defined as a direction from said pressure jaw frame towards said pressure element, i.e. in the same direction as the pressure element is movable relative said pressure jaw frame. For example, the compressing means may be arranged to be compressed and/or arranged to press, in the axial direction.

According to at least one example embodiment, said pressure element comprises at least a first guiding surface, and said guide comprises at least a second guiding surface whereby said pressure element is guidable along said guide by said first and said second guiding surfaces.

Hereby, the pressure element may be guided in the axial direction along said guide relative said pressure jaw frame. It should be understood that the first and the second guiding surface need not to be in constant contact with each other but may be intermittently in contact with each other. However, according to at least one embodiment, the first and the second contact surfaces are in constant contact with each other.

According to at least one example embodiment, said guide is arranged to limit the movement of said pressure element in a direction being perpendicular to said axial direction. For example, the guide may be coupled somehow to the pressure element, e.g. by a female-male coupling. Thus, according to at least one example embodiment, said pressure element is coupled to said guide by a male-female arrangement in order for said pressure element to be guidable along said guide.

Hereby, a simple but yet reliable guiding of said pressure element by said guide is provided.

According to at least one example embodiment, said guide comprises at least one groove, and said pressure element comprises at least one elongated protrusion arranged to be guided inside said groove. The elongated protrusion and the at least one groove together forms a male-female arrangement. The elongated protrusion and the groove may both have a main extension in the axial direction.

According to at least one example embodiment, the male-female arrangement is provided by that said pressure element comprises at least one groove, and said guide comprises at least one elongated protrusion arranged to be guided inside said groove According to at least one example embodiment, said guide is a separate part compared to the pressure jaw frame, and said guide is made of a different material compared to said pressure jaw frame.

Hereby, the guide may be made independently of the pressure jaw frame. For example, the guide may be made in a material facilitating guidance of the pressure element, such as e.g. bronze or plastic such as e.g. low-friction plastic.

Said guide may be seen as an elongation of the pressure jaw frame and/or as an elongated part or portion extending away from the pressure jaw frame in a direction being parallel to the axial direction, i.e. in the same direction in which the pressure element is movable relative the pressure jaw frame.

However, according to at least one example embodiment, said guide is made in the same material as the pressure jaw frame. According to at least one example embodiment, said guide is made in one piece with the pressure jaw frame and/or is made integrally with said pressure jaw frame. In such embodiments, the movement of the pressure element along the guide may be facilitated by sliding surfaces. Thus, according to at least one example embodiment, the pressure element and/or the guide comprises a sliding surface. The sliding surface may e.g. be a low-friction surface provided by a low-friction surface treatment or low-friction surface arrangement such as e.g. a small number of protrusions.

According to at least one example embodiment, said pressure jaw frame comprises a first end portion and a second end portion arranged distant from said first end portion, and said guide is a first guide and said pressure jaw assembly further comprises a second guide, said first guide being connected to said first end portion, and said second guide being connected to said first end portion.

Said second guide may be designed in a similar manner as the first guide. Thus, the above mentioned embodiments of the guide/first guide are applicable for the second guide as well. However, preferably the second guide is arranged mirrored to the first guide. Both said first and said second guides may be arranged as an elongation of said pressure jaw frame. Thus, the pressure element may be described as being arranged at least partly between said first and second guides. Hereby, the first and the second guides limit the movement of the pressure element in a direction being perpendicular to said axial direction. In other words, the pressure element is hereby limited in a direction being perpendicular to the axial direction. In other words, the first and the second guides and pressure jaw frame at least partly encompasses said pressure element. For example, the first and the second guides may form a U-shape together with a portion of the pressure jaw frame where each of the first and second guides forms the two parallel legs of the U-shape.

According to at least one example embodiment, the pressure element comprises a first end portion and a second end portion wherein the first end portion of the pressure element is arranged to face the first guide extending from the first end portion of the pressure jaw frame, and wherein the second end portion of the pressure element is arranged to face the second guide extending from the second end portion of the pressure jaw frame.

According to at least one example embodiment, the pressure jaw assembly is arranged with two male-female arrangement, one between the first guide and the pressure element, and one between the second guide and the pressure element. Thus, the pressure element may according to one example embodiment comprise an elongated protrusion on each of the first and second end portions of the pressure element.

According to at least one example embodiment, said compressing means is a compression spring.

Hereby, a simple but yet effective compressing means is provided. Thus, the compressing spring may be compressed as the pressure element is subject to an external pressure from e.g. a heating jaw assembly, whereby a transversal seal of the tube of packaging material may be provided. Hereby, the compressing spring acts as a dampening means which prevents, or at least reduces the risk of, damaging parts or portions of the pressure jaw assembly and/or the heating jaw assembly.

According to at least one example embodiment, said pressure jaw assembly further comprises connecting means arranged to connect said pressure element and said pressure jaw frame, wherein said compressing means is arranged between said connecting means and said pressure element and/or said pressure jaw frame.

Preferably, the connecting means is arranged such that a small gap is formed between the pressure jaw frame and the pressure element. The gap provides the possibility for the pressure element to be moved in a direction towards the pressure jaw frame as the pressure element is subject to an external pressure.

According to at least one example embodiment, where the compressing means is a compression spring, the compression spring is arranged in a helical arrangement around the connecting means.

The connecting means may e.g. be a bolt attached to the pressure jaw frame and extending through the pressure jaw frame and into, and arranged to attach to, the pressure element.

According to at least one example embodiment, the pressure jaw assembly comprises at least two elongated cutting rails arranged in connection with said pressure element, said elongated cutting rails being arranged an opposite side of the pressure element compared to the compressing means.

The cutting rails may be described as being in a pressurized connection with the pressure element. That is, the cutting rails are connected to, or is being attached to, the pressure element whereby the cutting rails and the pressure element is movable together.

Hereby, the pressure element need not be in direct contact with the tube of packaging material during the sealing procedure. The two cutting rails are preferably arranged a certain distance from each other and are thereby forming a slot arranged to hold a cutting means such as e.g. a knife. The cutting means may used after the sealing procedure in order to cut the tube of packaging material, preferably at the seal, in order to create separate packages.

According to at least a second aspect of the present invention, a sealing jaw arrangement for a filling machine is provided. Said sealing jaw arrangement comprises a pressure jaw assembly according to the first aspect of the present invention, and a heating jaw assembly.

Effects and features of this second aspect of the present invention are largely analogous to those described above in connection with the first aspect of the inventive concept. Embodiments mentioned in relation to the first aspect of the present invention are largely compatible with the second aspect of the invention.

The pressure jaw assembly and the heating jaw assembly of the sealing jaw arrangement may also be referred to as a pair of sealing jaws, as they are both active in creating the transversal seal in the tube of packaging material.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1:
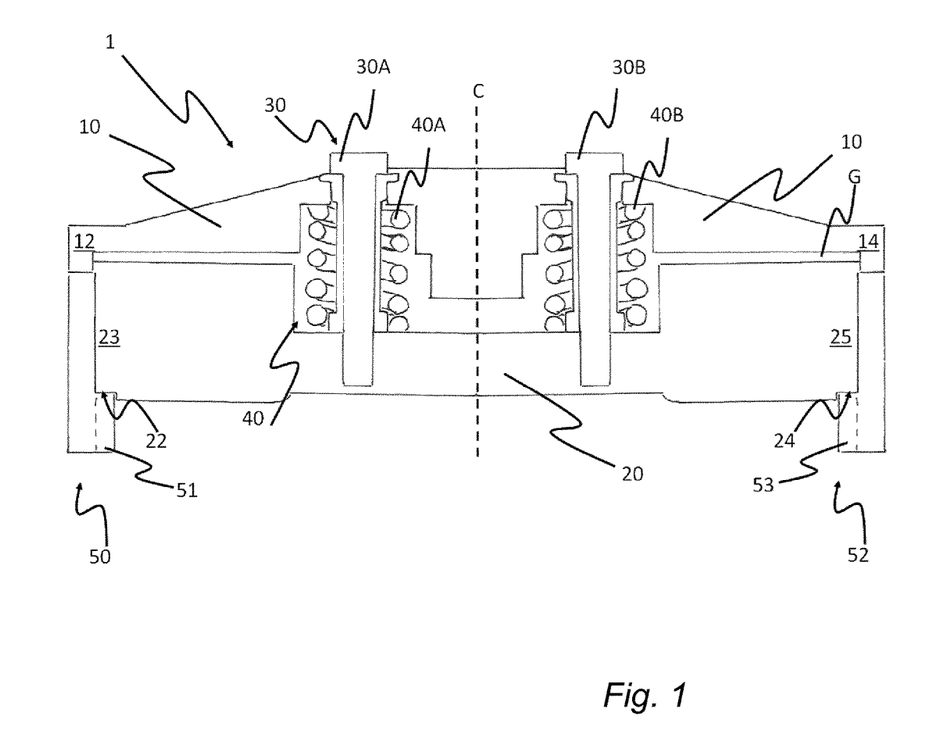
FIG. 1 is a cross-sectional view of a pressure jaw assembly in accordance with at least one embodiment of the invention.

FIG. 1 shows a pressure jaw assembly 1 in accordance with one embodiment of the present invention. The pressure jaw assembly 1 comprises a pressure jaw frame 10 and a pressure element 20 connected to each other by connecting means 30, in FIG. 1 illustrated as two bolts 30A, 30B. The pressure jaw assembly 1 further comprises a compressing means 40 arranged at least partly between the pressure jaw frame 10 and the pressure element 20. In FIG. 1, the compressing means 40 is embodied as two compression springs 40A, 40B, each surrounding one of the bolts 30A, 30B. Even though two bolts 30A, 30B and two compressing springs 40A, 40B are present in FIG. 1, the pressure jaw assembly 1 may comprise only one connecting means (e.g. only one bolt) and one compressing means (e.g. only one compressing spring). The connecting means 30 is connecting the pressure jaw frame 10 to the pressure element 20 such that a gap G is provided between the pressure jaw frame 10 and the pressure element 20. The gap G provides a space into which the pressure element 20 can be moved when being subject to an external force in a direction towards the pressure jaw frame 10.

The pressure jaw assembly 1 further comprises a guide 50, 52, connected to the pressure jaw frame 10. The guide 50, 52 is arranged externally of the pressure element 20 and is arranged to guide the pressure element 20 as it is moved relative the pressure jaw frame 10 (the use of the pressure jaw assembly 1 is further explained below with reference to FIGS. 2 and 3). In FIG. 1, the pressure jaw assembly comprises a first guide 50 and a second guide 52 arranged externally on opposite sides of the pressure element 20.

The first and the second guides 50, 52 will now be explained in more detail. Each of the guides 50, 52 are connected to a respective end portion of the pressure jaw frame 10. In other words, the pressure jaw frame comprises a first end portion 12 connected/attached to the first guide 50, and a second end portion 14 connected/attached to the second guide 52. As illustrated in FIG. 1, the first and the second end portions 12, 14 are arranged distant from each other, on opposite sides of a center axis C extending in the axial direction through the pressure jaw assembly 1. Hereby, the pressure element 20 is at least partly arranged between the first and the second guides 50, 52 whereby a movement of the pressure element 20 in a direction perpendicular to the center axis C is restricted by the first and the second guides 50, 52. In other words, the guides 50, 52 are arranged to limit the pressure element 20 with regards to movement in the direction perpendicular to the axial direction. Furthermore, as the guides extend in a direction parallel to the axial direction, guidance of the pressure element 20 in the direction along the axial direction is provided.

Each of the first and second guides 50, 52 may be arranged as a separate part compared to the pressure jaw frame 10, e.g. if the guides 50, 52 are to be made out of a different material compared to the pressure jaw frame 10. However, each of the first and second guides 50, 52 may according to one example embodiment be made in one piece with the pressure jaw frame 10. In both cases, the guides 50, 52 may be seen as lateral elongations 50, 52 of the pressure jaw frame 10.

Each of the guides 50, 52 in FIG. 1 comprises a first guiding surface 51, 53 arranged to be in contact with a respective second guiding surface 22, 24 of the pressure element 20. In other words, the first guide 50 comprises a first guiding surface 51 arranged to be in contact with a second guiding surface 22, arranged at a first end portion 23 of the pressure element, and the second guide 52 comprises a first guiding surface 53 arranged to be in contact with a second guiding surface 24, arranged at a second end portion 25 of the pressure element 20. The first and second guiding surfaces 51, 53, 22, 24 have a main extension in a direction parallel to the center axis C, and thereby facilitate guiding of the pressure element 20 during its relative movement compared to the pressure jaw frame 10 along the axial direction. The guides 50, 52 may be coupled to the respective end portions 23, 25 of the pressure element 20 by a male-female arrangement (shown in FIG. 2).

Figure 2:
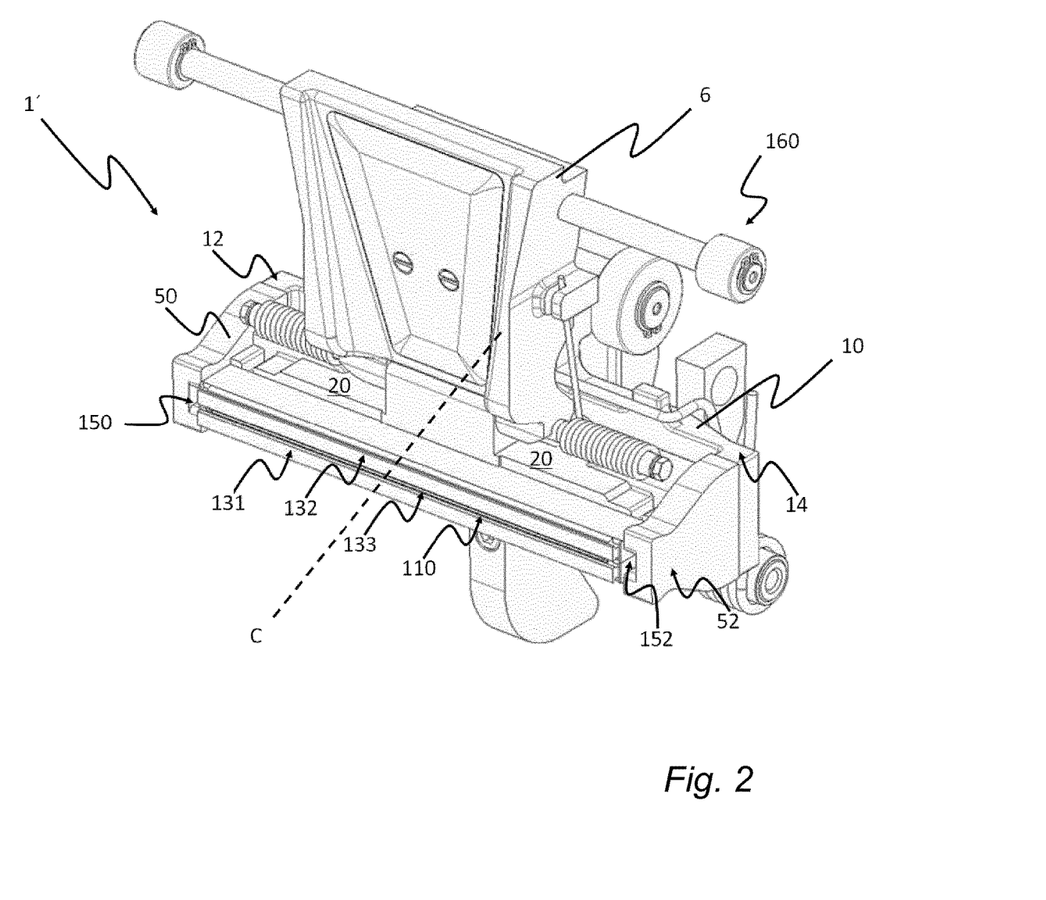
FIG. 2 is a perspective view of a pressure jaw assembly in accordance with at least one embodiment of the invention.

In FIG. 2, a similar pressure jaw assembly 1' as the pressure jaw assembly 1 of FIG. 1 is shown. The pressure jaw assembly 1' in FIG. 2 comprises the same or similar features as the pressure jaw assembly 1 in FIG. 1, why the same reference numerals are used for corresponding features, and are not explained again with reference to FIG. 2. However, the pressure jaw assembly 1' in FIG. 2 is more detailed compared to the pressure jaw assembly 1 in FIG. 1, and the main differences to the pressure jaw assembly 1 of FIG. 1 is explained below.

In FIG. 2, the pressure jaw assembly further comprises two cutting rails 130, 132 attached to the pressure element 20. For example, the two cutting rails 130, 132 may be connected directly on the pressure element 20, on an opposite side to the compressing means (shown in FIG. 1 only). The cutting rails 130, 132 are arranged at a small distance from each other such that a slot 133 is formed between the cutting rails 130, 132. The slot 133 is formed to house a knife 110, and to allow the knife 110 to exit out of the slot 133 during a cutting operation. The knife is activated automatically by a reciprocating movement of the pressure jaw assembly 1', e.g. through a cam arrangement.

Even though the pressure jaw assembly 1' is shown comprising two cutting rails, 130, 132 it is possible to form a similar arrangement from a single piece, or to form it from different pieces, being attached in different ways.

As shown in FIG. 2, the pressure jaw frame 10 has a main extension in a direction being perpendicular to the center axis C. The main extension of the pressure jaw frame 10 extends from a first end portion 12 to a second end portion 14. As the pressure jaw assembly 1 in FIG. 1, the pressure jaw assembly 1' comprises a first guide 50 and a second guide 52. The first guide 50 extends from the first end portion 12 away from the pressure jaw frame 10 in a direction parallel to the center axis C, and the second guide 52 extends from the second end portion 14 away from the pressure jaw frame 10 in a direction parallel to the center axis C. Each of the first and the second guides 50, 52 is arranged with a groove 150, 152 arranged to hold and guide corresponding first and second elongated protrusions (shown in FIG. 1) of the pressure element 20, thus forming male-female arrangements.

Furthermore, in FIG. 2, a driving means 160 configured to allow the pressure jaw assembly 1' to be moved along a profile during use of the pressure jaw assembly 1' is shown. The pressure jaw assembly 1' is thus arranged to be moved along the profile during the sealing procedure of the tube of packaging material.

Figure 3:
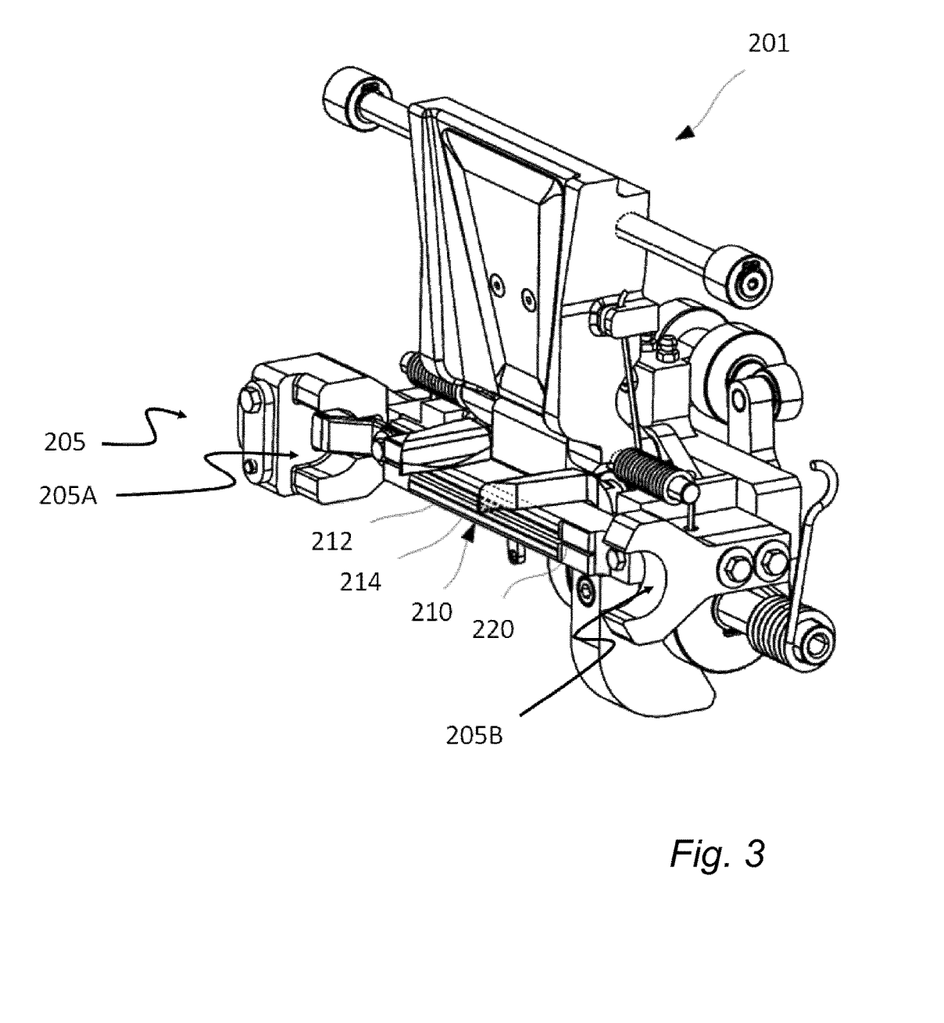
FIG. 3 is a perspective view of a heating jaw assembly, which together with a pressure jaw assembly form a sealing jaw arrangement, in accordance with at least one embodiment of the invention.

In FIG. 3, a heating jaw assembly 201 is shown. The heating jaw assembly 201 is arranged for interacting with the pressure jaw assembly 1, 1' during a sealing operation. The heating jaw assembly 201 typically comprises an inductor 210 for providing sufficient heat to the packaging material of the tube during the sealing procedure, and engaging means 205 arranged for engaging with the pressure jaw assembly 1, 1'. The engaging means 205 is in FIG. 3 illustrated as first and second gripping claw 205A, 205B arranged to engage with the first and second guides 50, 52 as the heating jaw assembly 201 interacts with the pressure jaw assembly 1, 1'.

As illustrated in FIG. 3, the heating jaw assembly 201 may also comprise a shallow groove 220 into which a knife of the pressure jaw assembly 1, 1' can enter during a cutting action. Thus, the inductor 210 may comprise an upper portion 212 and a lower portion 214 being separated by the shallow groove 220. The inductor 210 may further comprise an upper conductor arranged in said upper portion 212, and a lower conductor arranged in said lower portion 214 (i.e. the upper and lower conductor may be arranged on opposite sides of the shallow groove 220), for effectively heating the packaging material of the tube during the sealing procedure. The heat jaw assembly 201 may further comprise a cooling conduit (not shown) for cooling down the inductor 210.

Even though the heating jaw assembly 210 in FIG. 3 comprises an inductor for providing induction heat, but it is possible to have other forms of heat sealing, such as e.g. impulse heating, constant heating or ultrasonic sealing, as it is known to a person skilled in the art.

The function of the compressing jaw assembly will now be described with reference to FIGS. 2 and 3.

As the tube of packaging material is to be sealed, the pressure jaw assembly 1, 1' approaches the heating jaw assembly 201 by a suitable arrangement known in the art. For example, several pressure jaw assemblies may be arranged on a drive arrangement, and several heating jaw assemblies may be arranged on corresponding drive arrangement. The two drive arrangement may e.g. be arranged opposite to each other with the tube o packaging material arranged in between the two drive arrangement. As a pressure jaw assembly approaches and interacts with a heating jaw assembly, they together form a pair of sealing jaws for creating a transversal seal on the tube of packaging material.

As the tube of the packaging material is filled with liquid food, the tube of packaging material is transversally sealed such that separate packages portions with liquid food are formed. A transversal seal is performed by each pair of sealing jaws. The pressure jaw assembly 1, 1' and the heating jaw assembly 201 of a pair of sealing jaws are brought into contact with the tube of packaging material, which will flatten the tube. The heat generated by the heating jaw assembly 201 (e.g. by direct heating or induction heating) heats up the polymeric material on the inside of the tube, and the pressure arising from when the heating jaw assembly 201 is pressing the tube of the packaging material towards the pressure element 20 of the pressure jaw assembly 1, 1', make the inside surfaces of the tube to adhere to each other. In operation, a pair of sealing jaws forming a transversally seal is moved downward, feeding more packaging material to the tube-forming section. A new pair of sealing jaws is then brought into contact with the tube of the packaging material for creating a new transversally seal. In other words each pair of sealing jaws makes contact with the tube of packaging material at an almost constant position (position along Z), and the tube is then pulled down allowing for a new pair of sealing jaws to again make a transversal seal at the same position along Z as the previous pair of sealing jaws. This pulling action of the pair of sealing jaws on the tube is what feeds the web of packaging material through the machine. Sometimes, additional feeding rollers are provided further upstream in the filling machine, in order to reduce the tension in the web.

Two different pairs of sealing jaws may also create transversal seal on the tube orthogonally compared to each other, for example if a tetrahedral package having a top fin and a bottom fin that are orthogonal to each other is to be formed.

It will of course be understood that each pair of sealing jaws in making a transversal seal across the tube of packaging material is making in the same operation the top sealed edge for one of the individual packages, and the bottom sealed edge for another of the individual packages, the tube of packaging material being subsequently cut along approximately the median line of each transversal seal by any suitable means, (such as e.g. a knife 100 shown in FIG. 2), to separate the strip material into individual packages.

The skilled person realizes that a number of modifications of the embodiments described herein are possible without departing from the scope of the invention, which is defined in the appended claims.

The invention claimed is:

1. A pressure jaw assembly for a sealing jaw arrangement of a filling machine, wherein the pressure jaw assembly is configured to interact with a heating jaw assembly, the pressure jaw assembly comprising:
   a pressure jaw frame;
   a pressure element arranged to be moved relative to the pressure jaw frame;
   a compression member arranged at least partly between the pressure jaw frame and the pressure element, the compression member being arranged to influence the relative movement between the pressure element and the pressure jaw frame; and
   a guide, connected to the pressure jaw frame and arranged external to an end portion of the pressure element, to guide the pressure element,
   wherein the guide is configured to engage with the heating jaw assembly.

2. The pressure jaw assembly according to claim 1, wherein:
   the pressure element comprises at least a first guiding surface;
   the guide comprises at least a second guiding surface; and
   the first and second guiding surfaces are arranged to guide the pressure element along the guide.

3. The pressure jaw assembly according to claim 1, wherein the pressure element is coupled to the guide by a male-female arrangement in order for the pressure element to be guidable along the guide.

4. The pressure jaw assembly according to claim 3, wherein:
   the guide comprises at least one groove; and
   the pressure element comprises at least one elongated protrusion arranged to be guided inside the groove.

5. The pressure jaw assembly according to claim 1, wherein:
   the guide is arranged separately from the pressure jaw frame; and
   the guide and the pressure jaw frame are made of different materials.

6. The pressure jaw assembly according to claim 1, wherein:
   the pressure jaw frame comprises a first end portion and a second end portion arranged distant from the first end portion, and wherein said
   the guide comprises a first guide connected to the first end portion of the pressure jaw frame and a second guide connected to the second end portion of the pressure jaw frame.

7. The pressure jaw assembly according to claim 1, wherein the compression member is a compression spring.

8. The pressure jaw assembly according to claim 1, further comprising a coupler arranged to connect the pressure element and the pressure jaw frame, and wherein the compression member is arranged between the coupler and at least one of the pressure element or the pressure jaw frame.

9. The pressure jaw assembly according to claim 1, further comprising at least two elongated cutting rails arranged in connection with the pressure element, wherein the elongated cutting rails are arranged an opposite side of the pressure element relative to the compression member.

10. A sealing jaw arrangement for a filling machine, comprising:
    a pressure jaw assembly according to claim 1; and
    a heating jaw.

11. The pressure jaw assembly according to claim 1, wherein:
    the pressure element comprises a first end portion and a second end portion;
    the guide comprises a first guide and a second guide;
    the first guide comprises a first guiding surface arranged to be in contact with a second guiding surface at the first end portion of the pressure element; and
    the second guide comprises a third guiding surface arranged to be in contact with a fourth guiding surface at the second end portion of the pressure element.

12. The pressure jaw assembly according to claim 9, further comprising a slot formed between the two elongated cutting rails, wherein the slot is arranged to house a knife therein.

13. The sealing jaw arrangement according to claim 10, wherein the heating jaw comprises an inductor arranged to provide heat to a packaging material.

14. The sealing jaw arrangement according to claim 10, wherein:
    the guide of the pressure jaw assembly comprises a first guide and a second guide; and
    the heating jaw comprises a first gripping claw arranged to engage with the first guide and a second gripping claw arranged to engage with the second guide when the pressure jaw assembly interacts with the heating jaw.

15. The sealing jaw arrangement according to claim 10, wherein:
    the heating jaw comprises a groove; and
    a knife of the pressure jaw assembly is arranged to enter the groove of the heating jaw during a cutting process.

16. The sealing jaw arrangement according to claim 15, wherein the knife is activated automatically by a movement of the pressure jaw assembly.

17. The sealing jaw arrangement according to claim 15, wherein:
    the heating jaw comprises an inductor; and
    an upper portion of the inductor and a lower portion of the inductor are separated by the groove.

18. The sealing jaw arrangement according to claim 17, wherein the inductor comprises an upper conductor arranged in the upper portion and a lower conductor arranged in the lower portion.

19. The sealing jaw arrangement according to claim 10, wherein:
the pressure jaw assembly is arranged on a first drive arrangement;
the heating jaw is arranged on a second drive arrangement opposite the first drive arrangement; and
the pressure jaw assembly and the heating jaw are arranged to approach and interact with each other to transversally seal a tube of packaging material arranged in between the first and second drive arrangements.

20. The sealing jaw arrangement according to claim 19, wherein the tube of packaging material is filled with liquid food.

21. A pressure jaw assembly for a sealing jaw arrangement of a filling machine and arranged to interact with a heating jaw assembly, the pressure jaw assembly comprising:

a pressure jaw frame;
a pressure element arranged to be moved relative to the pressure jaw frame;
a coupler arranged to connect the pressure element and the pressure jaw frame;
a compression member surrounding the coupler and arranged at least partly between the pressure jaw frame and the pressure element, the compression member being arranged to influence the relative movement between the pressure element and the pressure jaw frame;
a first guide connected to the pressure jaw frame and arranged external to a first end portion of the pressure element to guide the pressure element; and
a second guide connected to the pressure jaw frame and arranged external to a second end portion of the pressure element to guide the pressure element,
wherein the first and second guides are arranged to engage with a first gripping claw and a second gripping claw, respectively, of the heating jaw assembly.

* * * * *